Dec. 21, 1926. 1,611,300

J. WILLIAMS

DITCH TRIMMER

Filed Oct. 13, 1925

Inventor

John Williams.

By A. J. O'Brien

Attorney

Patented Dec. 21, 1926.

1,611,300

UNITED STATES PATENT OFFICE.

JOHN WIILLIAMS, OF MEEKER, COLORADO, ASSIGNOR OF FOUR-FIFTHS TO RICHARDSON H. TAYLOR, OF MEEKER, COLORADO.

DITCH TRIMMER.

Application filed October 13, 1925. Serial No. 62,220.

This invention relates to improvements in ditch trimmers.

In many parts of our country irrigation has to be resorted to in order to obtain good crops. In conducting the water from the main ditches and laterals, small ditches are used. The slides of these ditches soon become covered with grass and weeds that droop over into the ditch and tends to obstruct the flow of water through the same. In the spring and whenever else it is necessary, the ditches must be cleaned and where there is a large amount of overhanging vegetation, it must be removed and this is usually accomplished by means of a sharp spade. The ditch is afterwards cleaned. The trimming of ditches by means of a spade is slow and laborious work which is therefore often slighted with the result that trouble is experienced during the irrigation period when there is very little time for remedying it.

It is the object of this invention to produce a tool that can be drawn by horses, like a plow, and which will cut and trim the sides of the ditches in a satisfactory manner.

My invention can be most clearly described and will be most readily understood when reference is had to the acompanying drawing in which it has been illustrated and in which.

Figure 1:
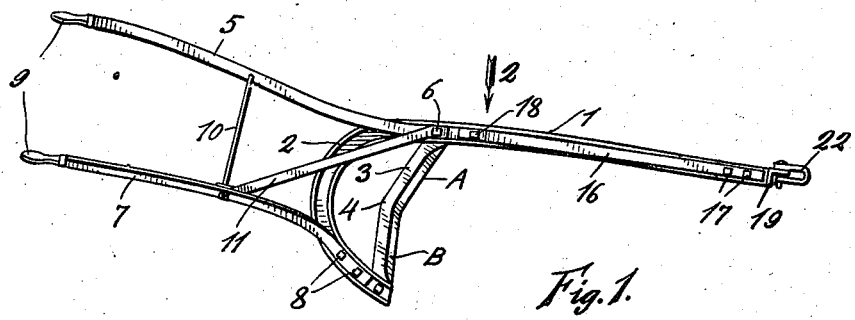
Fig. 1 is a side elevation of my improved trimmer looking in the direction of arrow 1 in Fig. 2.
Figure 2:
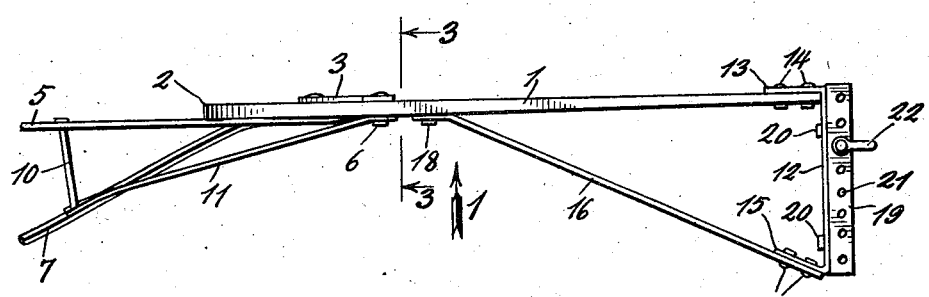
Fig. 2 is a top plan view of the trimmer looking downwardly in the direction of the arrow 2 in Fig. 1.

Numeral 1 designates a beam that is constructed like an ordinary plow beam and has its rear end 2 curved downwardly and forwardly in the manner shown in Fig. 1, a sharpened steel cutter blade 3 connects the forwardly projecting end of the curved part 3 with the upper portion of the beam 1 in the manner shown in Fig. 1. The cutter is preferably bent at 4 and has two straight portions A and B. A handle 5 is connected to the beam. A second handle 7 is connected to the lower end of the beam by means of bolts 8 and extends upwardly at an outwardly inclined angle. The two handles have hand grips 9 and are joined together by means of rods 10 and 11. Secured to the front end of the beam 1 is a flat bar 12 having one end 13 bent rearwardly at an angle of ninety degrees and fastened to the beam by bolts or rivets 14. The other end 15 is bent rearwardly at a greater angle than the end 13 and is connected to the front end of the bar 16 by bolts or rivets 17. The rear end of bar 16 is fastened to the beam by means of a bolt 18. An angle iron 19 is secured to the front side of the bar 12 by means of bolts 20 and has one flange provided with a plurality of holes 21 to which the clevis 22 is attached. The clevis 22 is employed to connect the evener to which the horses are hitched. By moving the clevis along the bar 19, the proper hitch for the particular job may soon be determined.

Figure 3:
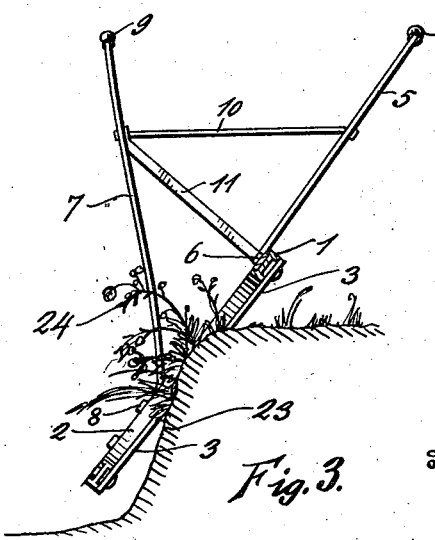
Fig. 3 is a section taken on line 3—3 Fig. 2 showing the manner of using the trimmer.

In Fig. 3 I have shown one side 23 of a ditch and have indicated at 24 the overhanging grass which is to be cut away. The trimmer is preferably held so that the cutter 3 cuts on a slant in the manner shown. The dirt and grass trimmed away falls into the ditch and is later removed therefrom, thus producing a clean ditch with smooth sides. The tool above described is very simple and will do in a short time the work that in the old way required a very much longer time to perform.

Having now described the invention what is claimed as new is:

A ditch trimmer comprising, in combination, a beam having its rear end curved downwardly and forwardly along a gradual, substantially arcuate curve until the lower end extends in a forward direction, a cutter bar extending from the lower end of the beam to a point on the upper portion of the beam, a handle secured to the beam near the point where the upper end of the cutter is attached to it and extending rearwardly in the plane of the curved portion of the beam, a second handle secured to the beam near the bottom of the curved portion and extending upwardly and outwardly at an angle with the first handle, each handle having a hand grip portion, said hand grip portions being on different levels when the beam is in vertical position whereby the beam will be held in an inclined position when the hand grip portions are at an equal height and means at the forward end of the plow for attaching horses to the beam.

In testimony whereof I affix my signature.

JOHN WILLIAMS.